J. MARTYN.
SACK CHUTE ATTACHMENT FOR HARVESTERS.
APPLICATION FILED OCT. 30, 1908.
Patented Mar. 30, 1909.
2 SHEETS—SHEET 1.
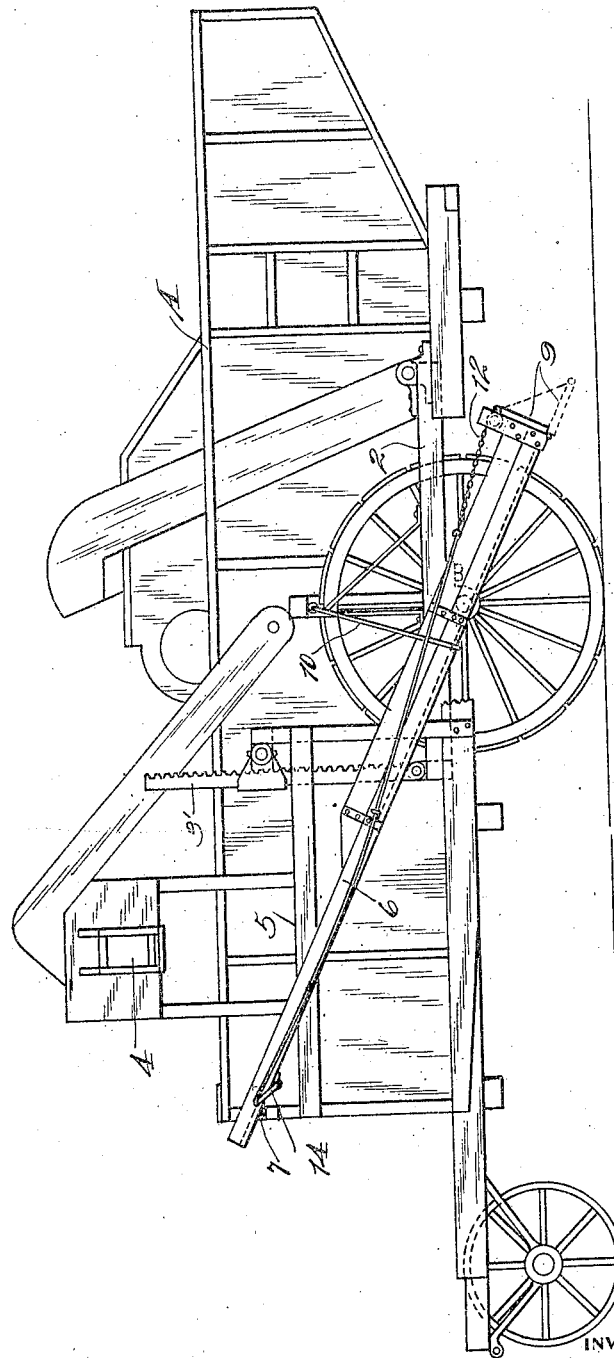
WITNESSES
INVENTOR,
Joseph Martyn;
BY Geo. H. Strong
his ATTORNEY J. MARTYN.
SACK CHUTE ATTACHMENT FOR HARVESTERS.
APPLICATION FILED OCT. 30, 1908.
916,884.
Patented Mar. 30, 1909.
2 SHEETS—SHEET 2.
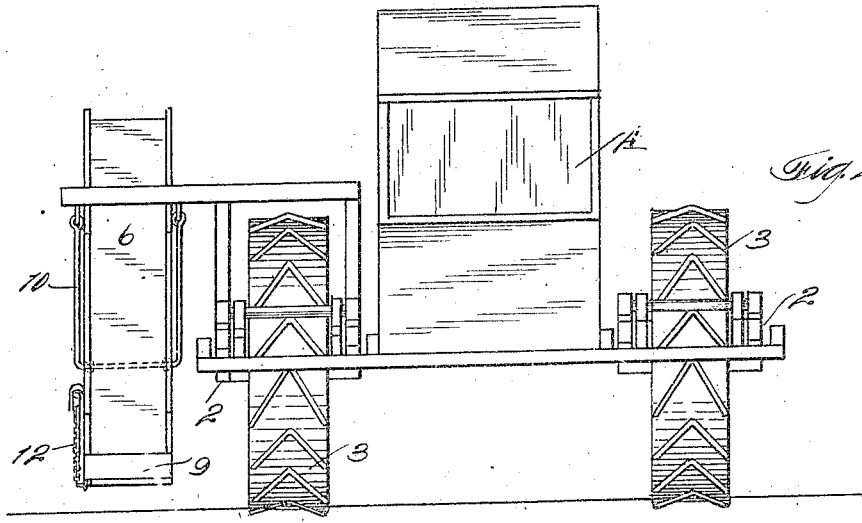
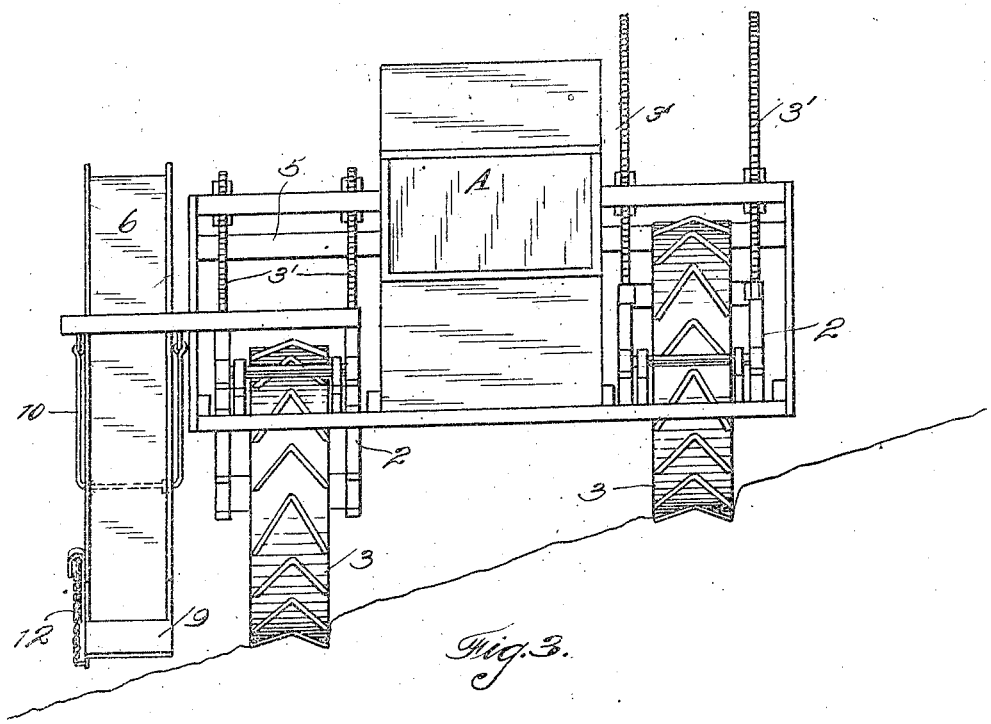
WITNESSES
F. E. Maynard,
F. Castberg.
INVENTOR,
Joseph Martyn,
BY Geo. H. Strong.
his ATTORNEY

UNITED STATES PATENT OFFICE.

JOSEPH MARTYN, OF STOCKTON, CALIFORNIA, ASSIGNOR TO THE HOLT MANUFACTURING CO., OF STOCKTON, CALIFORNIA, A CORPORATION.

SACK-CHUTE ATTACHMENT FOR HARVESTERS.

No. 916,884.     Specification of Letters Patent.     Patented March 30, 1909.

Application filed October 30, 1908. Serial No. 460,185.

*To all whom it may concern:*

Be it known that I, JOSEPH MARTYN, citizen of the United States, residing at Stockton, in the county of San Joaquin and State of California, have invented new and useful Improvements in Sack-Chute Attachments for Harvesters, of which the following is a specification.

My invention relates to an attachment which is especially designed for that class of harvesting machines intended for side-hill work.

It consists of a chute for discharging the sacks of grain when filled and sewed, and means for adjusting the chute in unison with the adjustments of the apparatus upon side hills and varying surfaces over which the machine must travel.

It also comprises details of construction which will be more fully explained by reference to the accompanying drawings, in which—

Figure 1 is a side elevation of a harvester, showing the application of my sack chute attachment. Fig. 2 is a rear view of the machine of Fig. 1, with parts of the machine omitted, and the machine on level ground. Fig. 3 is a similar view showing some of the details omitted in Fig. 2, with the apparatus adapted to side-hill work.

My invention is designed to provide an adjustable chute for application to that class of machines which are designed to work upon side hills, and in which the main bearing wheels have frames adjustable so that one wheel may be raised, and the other depressed for the purpose of maintaining the threshing and cleaning portion of the apparatus substantially level transversely. If an ordinary fixed chute were attached to such a machine, the discharge end would have to be permanently fixed at a considerable height in order to prevent its striking the ground, when the upward incline of the hill was upon that side of the machine, and when the machine would travel upon a hill having an inclination in the other direction, the distance from the mouth of the chute to the ground, would be so great that sacks would be broken and damaged if discharged.

A is the main frame of a machine of this class, having independent wheel frames 2 hinged within the main wheel frames, and carrying the shafts or journal-boxes of the wheels 3. By means of suitable mechanism, as the well known rack and pinion devices 3', the free ends of these hinged wheel frames may be raised and depressed respectively upon opposite sides of the machine, one wheel going down and the other rising so that the harvester mechanism carried upon the main frame A, will remain substantially level.

The grain from the supplemental cleaner 4 is discharged through a suitable discharge gate into sacks, and a platform 5 is provided for said sacks and the operator who attends to their filling and subsequent sewing.

6 is a chute having the upper end hinged as shown at 7 to some permanent support of the machine, such as a projecting beam. This chute extends downward parallel with the main frame of the machine, and at its lower end is provided with a gate 9. The lower end of the chute is suspended by links or hangers 10 from a beam or structure which projects outwardly, and is supported from the hinged or swinging wheel-frame 2, so that any change in the position of this wheel-frame, caused by the leveling of the machine, will correspondingly raise or lower the discharge end of the chute, thus enabling the chute to automatically maintain its discharge end at a desired distance from the surface of the ground to prevent injury to sacks when discharged. The gate 9 is hinged at the bottom, and has a chain or equivalent flexible connection 12 running over the guide pulley at the top of the terminal post at the end of the chute, thence extending up to a point near the sack-sewer's platform, where it may connect with a lever, or equivalent device as at 14, whereby the gate may be opened or closed so that as the sacks are sewed, the gate being closed, the sacks will slide down the chute, and be gathered at the lower end thereof until a sufficient number have been accumulated, when the gate may be opened, and the sacks discharged in a body ready to be subsequently collected. The gate is then closed for another accumulation. Preferably, the gate at the bottom opens outward and downward and continues the slide near the ground and has a tendency to save the sack from breaking; in other words, shortens the drop very much.

In all the movements of the machine upon a side hill it will thus be manifest that the lower discharge end of the chute being substantially carried in unison with the bearing wheel upon that side, will always remain at the same distance from the ground, and no injury to sacks will occur from the discharge.

Having thus described my invention, what I claim and desire to secure by Letters Patent is—

1. The combination with an adjustable side hill harvester, of a sack discharging chute automatically adjustable in unison with the harvester.

2. The combination with a side hill harvester having bearing wheel frames adapted to be raised and depressed upon opposite sides of the machine, of a sack discharging chute having the upper end hinged to the machine, and the lower discharge end connected and movable with the bearing-wheel frame.

3. The combination with a harvester of the character described, bearing wheel frames hinged and vertically movable with relation to the main frame, of a sack-discharging chute having the upper end hinged to the main frame support, connections between the lower end of the chute and the movable wheel frame, and a controlling closing gate at said lower end.

4. The combination with a harvesting apparatus of the character described, a main frame, bearing-wheel frames hinged thereto and movable to raise and depress the wheels, of a sack-discharging chute having its upper end hinged to the main frame, a bearing beam supported and projecting from the movable wheel frame, suspending links connecting said beam with the lower end of the chute, a hinged gate by which the lower end of the chute is closed, and connections between said gate and an operating device contiguous to the upper end of the chute.

In testimony whereof I have hereunto set my hand in presence of two subscribing witnesses.

JOSEPH MARTYN.

Witnesses:
F. H. CHISHOLM,
W. P. FERGUSSON.